US006240456B1

(12) United States Patent
Teng et al.

(10) Patent No.: US 6,240,456 B1
(45) Date of Patent: *May 29, 2001

(54) SYSTEM AND METHOD FOR COLLECTING PRINTER ADMINISTRATION INFORMATION

(75) Inventors: Chia-Chi Teng; Babak Jahromi, both of Redmond, WA (US)

(73) Assignee: Microsoft Corporation, Redmond, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/932,723

(22) Filed: Sep. 18, 1997

(51) Int. Cl.[7] ....................................................... B06F 15/16
(52) U.S. Cl. ........................... 709/230; 709/225; 709/230; 709/250; 340/825.07; 370/475; 710/3; 710/9
(58) Field of Search .......................... 395/200.55, 200.58, 395/200.59, 200.6, 200.8; 709/225, 228, 229, 230, 250, 220, 243, 245; 340/825.07; 370/475; 711/200, 202; 710/3, 4, 9

(56) References Cited

U.S. PATENT DOCUMENTS

| 5,537,626 | * | 7/1996 | Kraslavsky et al. | 395/828 |
| 5,572,643 | * | 11/1996 | Judson | 395/793 |
| 5,625,781 |   | 4/1997 | Cline . | |
| 5,687,320 | * | 11/1997 | Wiley et al. | 395/200.16 |
| 5,708,780 | * | 1/1998 | Levergood et al. | 395/200.12 |
| 5,715,453 | * | 2/1998 | Stewart | 3952/615 |
| 5,721,908 | * | 2/1998 | Largarde et al. | 395/610 |
| 5,732,219 | * | 3/1998 | Blumer et al. | 395/200.57 |
| 5,734,831 | * | 3/1998 | Sanders | 395/200.53 |
| 5,740,263 | * | 4/1998 | Cohn et al. | 379/89 |
| 5,742,768 | * | 4/1998 | Gennaro et al. | 295/200.53 |
| 5,742,845 | * | 4/1998 | Wagner | 395/831 |
| 5,745,360 | * | 4/1998 | Leone et al. | 364/140 |
| 5,752,246 | * | 5/1998 | Rogers et al. | 707/10 |

(List continued on next page.)

OTHER PUBLICATIONS

"Printer MIB",.Mar. 1995, Smith et. al., Internet Network Working Group.
"Internet Printing Protocol/1.0", Jul. 25, 1997 DeBry et al., Internet Network Working Group.
"Inside Windows NT", Custer, 1993, Chapter Nine entitled "Networking".
"Hypertext Transfer Protocol—HTTP/1.1", Jan. 1997, Fielding et al., Internet Network Working Group.
"An Extension to HTTP: Digest Access Authentication", Jan. 1997, Franks et al., Internet Network Working Group.
180/IEC ID175–2; Sep. 1, 1996.
180/IEC 10175–1; Sep. 1, 1996.

*Primary Examiner*—Robert B. Harrell
*Assistant Examiner*—Stephan Willett
(74) *Attorney, Agent, or Firm*—Leydig, Voit & Mayer Ltd.

(57) ABSTRACT

An implementation of a computer network which provides the ability for a network client to submit data to a network server for performing a job at a logical endpoint associated with the network server. By way of example, the data may be a print job, the job a printing operation, and the logical endpoint a printer. The logical endpoint is assigned a uniform resource locator (URL) address which allows the data to be routed thereto and the computer network communication messages are formatted into the hypertext transfer protocol (HTTP). A further implementation of the computer network also provides the network client with the ability to perform system administration utilizing a standard Internet browser application.

16 Claims, 14 Drawing Sheets

U.S. PATENT DOCUMENTS

| | | | |
|---|---|---|---|
| 5,754,830 | * | 5/1998 | Butts et al. ............................ 395/500 |
| 5,764,908 | * | 6/1998 | Shoji et al. ...................... 395/200.47 |
| 5,765,176 | | 6/1998 | Bloomberg . |
| 5,774,670 | * | 6/1998 | Montulli .......................... 395/200.57 |
| 5,787,254 | * | 7/1998 | Maddalozzo, Jr. et al. ..... 395/200.58 |
| 5,790,790 | * | 8/1998 | Smith et al. ..................... 395/200.36 |
| 5,790,793 | * | 8/1998 | Higley ............................. 395/200.48 |
| 5,793,966 | * | 8/1998 | Amstein et al. ................. 395/200.33 |
| 5,796,393 | * | 8/1998 | MacNaughton et al. ............ 345/329 |
| 5,799,206 | * | 8/1998 | Kitagawa et al. .................... 395/856 |
| 5,802,530 | * | 9/1998 | Van Hoff ............................. 707/513 |
| 5,826,242 | * | 10/1998 | Montulli ................................ 705/27 |
| 5,867,636 | | 2/1999 | Walker . |
| 5,898,835 | | 4/1999 | Truong . |
| 5,901,286 | * | 5/1999 | Danknick et al. .............. 395/200.33 |
| 5,905,908 | | 5/1999 | Wagner ................. 395/831 |
| 5,974,234 | | 10/1999 | Levine et al. . |
| 5,987,480 | | 11/1999 | Donohue et al. . |

* cited by examiner

SYSTEM AND METHOD FOR COLLECTING PRINTER ADMINISTRATION INFORMATION

CROSS REFERENCE TO RELATED APPLICATION

This application is related to U.S. application Ser. No. 08/932,772, by Chia-Chi Teng and Babak Jahromi, entitled "COMPUTER NETWORK", which is commonly assigned and which was filed concurrently herewith.

FIELD OF THE INVENTION

This invention relates generally to computer networks and, more particularly, relates to an implementation of a computer network which allows a network client to perform various system administrative tasks and/or request a network server to perform a job.

BACKGROUND OF THE INVENTION

As defined in Helen Custer, INSIDE WINDOWS NT (Microsoft Press, 1993), pp. 285–326, which book is incorporated herein by reference in its entirety, a computer network is an interconnected collection of autonomous computers in which each computer is physically separate and runs its own operating system. The role of network software is to take a job request, usually an I/O request, from an application running on a network client, pass it to a network server, execute the request on the network server, and return the results to the network client. During these operations it will be appreciated that the network software is required to transform the request several times. For example, a high-level request such as "read x number of bytes from file y on an I/O device associated with network server z" requires the network software to determine how to get to network server z and what communication protocol network server z understands. Then the request must be altered for transmission across the network communications link and, when the request reaches network server z, it must be checked for completeness and compatibility, decoded, and sent to the correct operating system component to execute the request. Finally, the reply must be coded for sending back across the network communications link to the network client.

By way of example, the Windows NT brand operating system allows user-mode software running on a network client to request the performance of a job on a remote, compatible network server. Specifically, when the user-mode software, such as an I/O application programming interface (API), issues a remote I/O request by calling native I/O services, some initial processing is performed, the I/O manager creates an I/O request packet (IRP) and passes the request to one of its registered file system drivers, e.g. a redirector associated with a transport driver. The redirector and transport driver provide the facilities necessary for a client computer utilizing the Windows NT brand operating system to gain access via the network communications link to files, named pipes, printers, etc. associated with the compatible network server. Similarly, when a request arrives at a network server utilizing the Windows NT brand operating system from a remote, compatible network client, it is received by a server, similarly processed, and forwarded on to the appropriate job server which performs the requested job.

Unfortunately, in a distributed computer network where there are a variety of computers running a variety of operating systems each having a different set of APIs, protocols, device naming conventions, etc., incompatibilities abound. Accordingly, the various redirector, server, and transport drivers associated with the network client and server must be continually updated, i.e. loaded and unloaded, in order to establish a computer network model into which the various components may fit. Ensuring this required compatibility makes it difficult and costly to write network software especially when multiple different products from multiple different vendors are desired to work together.

In particular, with respect to network software for use in requesting printing jobs, when a network client wants to send a print job to a remote printer server, it has to use the printing APIs of a particular computer network protocol that the printer server supports. Since different operating systems often use different computer network protocols and different naming conventions, a print job request issued by a network client utilizing a first operating system cannot be forwarded to a printer server associated with a network server utilizing a different operating system unless the network client has installed thereon software which functions to overcome the noted incompatibilities. Likewise, printer administration tools will only work in connection with the one operating system they were designed for thereby requiring vendors to write specialized, standalone software applications which may be used to allow administrators to manage the printers/printer servers over the computer network. Furthermore, these specialized software applications have to be installed on every network client which the system administrator may desire to use to perform system administration.

From the foregoing, it is evident that a need exists for an improved computer network which generally allows network software to be easily written for network clients and network servers utilizing different operating systems. A related need also exists for such a computer network which eliminates the need to install any specialized administration tools on the client side of the computer network. For example, it would be desirous to provide a computer network which allows network software to be platform independent and, similarly, which allows vendors to write server side administration tools which can be managed from any network client without regard to operating system incompatibilities.

SUMMARY OF THE INVENTION

According to these needs, the invention is directed to an implementation of a computer network which generally provides the ability for a network client to submit data to a network server for performing a job at a logical endpoint associated with the network server. By way of example only, the data may pertain to a print job or a file, the job may be a printing operation or a file save operation, and the logical endpoint may be a printer or a disk drive, respectively. The logical endpoint is assigned a Uniform Resource Locator (URL) address which allows the data to be routed thereto.

Specifically, when the network client receives a request to perform a job, the network client performs a check on the address of the logical endpoint and, if the address is a URL address, the client will place the data necessary to perform the job into a Hypertext Transfer Protocol (HTTP) formatted message. The HTTP formatted message may then be submitted to the network server via a network communications link such as the Internet. Once the network server receives the HTTP formatted message, it uses the URL address to route the message to a server process associated with the logical endpoint. The server process parses the HTTP formatted message to extract the data and submits the data to the logical endpoint which then performs the requested job.

A further feature of the invention provides a means for allowing the network client to perform system administration utilizing an ordinary network browser application. In particular, the network server is provided with the ability to dynamically generate Hypertext Markup Language (HTML) pages in response to requests by the network client. These HTML pages will allow the user to view information about the network server and/or allow for the performance of various administrative tasks. The HTML pages may be customized by vendors to present unique information to the user or be associated with vendor supplied software components, such as a Dynamic-Link Library (DLL), which provides a means for communicating with a device having a proprietary protocol.

A better understanding of the objects, advantages, features, properties and relationships of the invention will be obtained from the following detailed description and accompanying drawings which set forth illustrative embodiments which are indicative of the various ways in which the principles of the invention may be employed.

BRIEF DESCRIPTION OF THE DRAWINGS

For a better understanding of the invention, reference may be had to the preferred embodiments shown in the accompanying drawings in which.

DETAILED DESCRIPTION OF THE INVENTION

Figure 1:
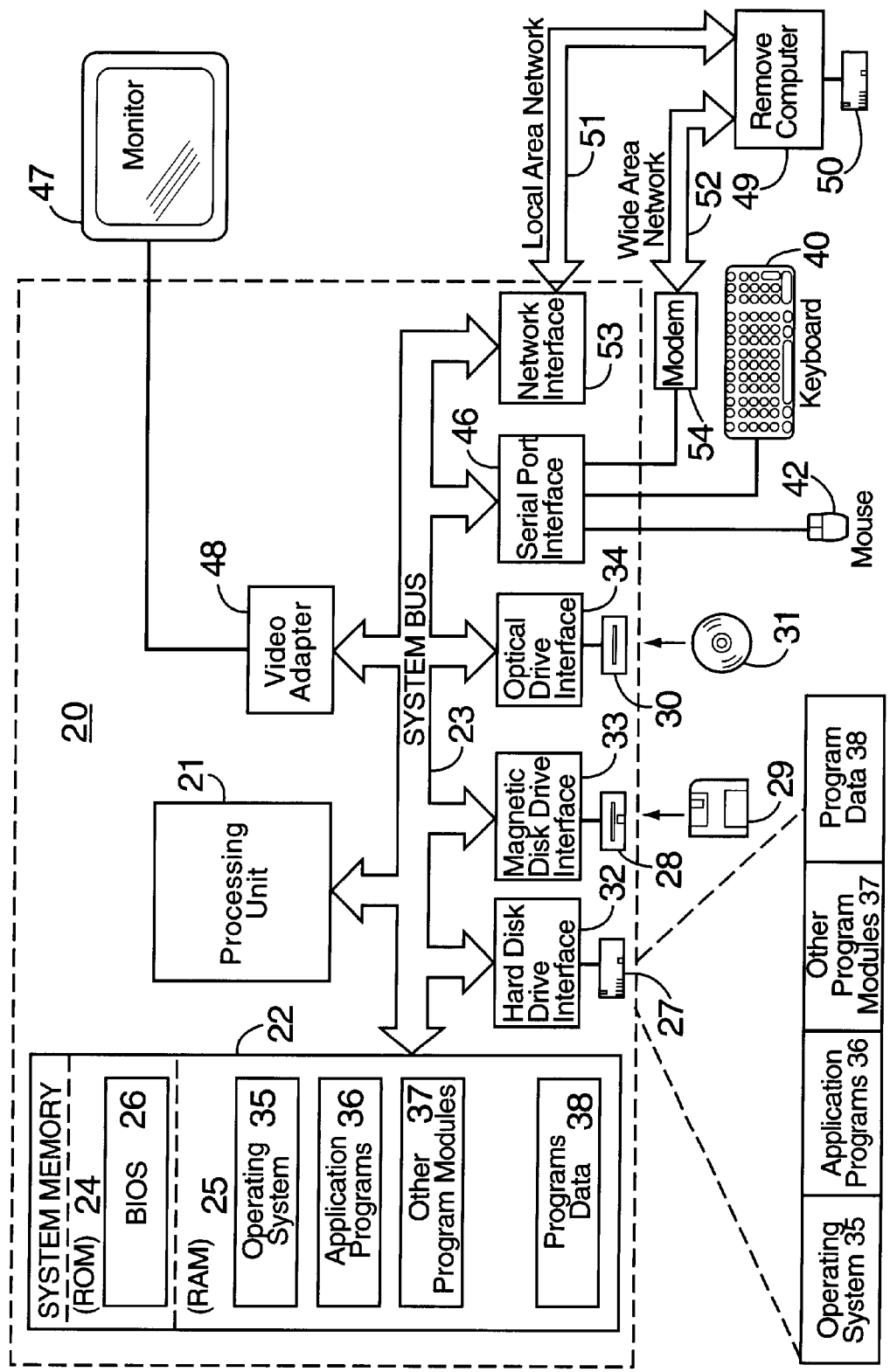
FIG. 1 illustrates a block diagram schematic view of a computer system on which the invention resides.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, such as smart printers, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a network client general in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the network client 20, such as during start-up, is stored in ROM 24. The network client 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the network client 20. Although the exemplary environment described herein employs a hard disk, a removable magnetic disk 29, and a removable optical disk 31, it will be appreciated by those skilled in the art that other types of computer readable media which can store data that is accessible by a computer, such a magnetic cassettes, flash memory cards, digital video disks, Bernoulli cartridges, random access memories, read only memories, and the like may also be used in the exemplary operating environment.

A number of program modules may be stored on the hard disk, magnetic disk 29, optical disk 31, ROM 24 or RAM 25, including an operating system 35, one or more applications programs 36, other program modules 37, and program data 38. A user may enter commands and information into the network client 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices, not shown, such as speakers and printers.

The network client 20 operates in a networked environment using logical connections to one or more remote network servers, such as a network server 49. The network server 49 may be another personal computer, a server, a router, a network PC, a peer device or other common network node, and typically includes many or all of the elements described above relative to the network client 20, although only a printer 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the network client 20 is connected to the local network 51 through a network interface or adapter 53. When used in a WAN networking environment, the network client 20 typically includes a modem 54 or other means for establishing communications over the WAN 52. The modem 54, which may be internal or external, is connected to the system bus 23 via the serial port interface 46. In a networked environment, program modules depicted relative to the network client 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by the network client 20 and network server 49, unless indicated otherwise. As such, it will be understood that such acts and operations, which are at times referred to as being computer-executed, include the manipulation by the CPUs of the devices of electrical signals representing data in a structured form. This manipulation transforms the data or maintains it at locations in the memory system, which reconfigures or otherwise alters the operation of the network client 20 and/or the network server 49 in a manner well understood by those skilled in the art of computer systems. The data structures where data is maintained are physical locations of the memory that have particular properties defined by the format of the data. While the invention is being described in the foregoing context, it is not meant to be limiting as those skilled in the art of computer systems will further appreciate that various of the acts and operation described herein may also be implemented in hardware.

As previously mentioned, the invention is preferably realized within the computer environment illustrated in FIG. 1 as one or more computer-executable applications 36 which provide for the networking of the network client 20 and the network server 49. Generally, with reference to FIGS. 2 and 3, a first embodiment of the invention allows the network client 20 to submit data, such as a print job, file, etc., to a logical endpoint, such as the printer 50, storage media, etc., associated with the network server 49. The logical endpoint is assigned a Uniform Resource Locator (URL) address, having the basic form:

"HTTP://server/share/share_name/ . . . /item", which allows the network client 20 and the network server 49 to route the data thereto. Upon the receipt of the data, the logical endpoint will perform the desired job, such as printing, storing, etc. As will become apparent, the URL address is specifically used since it provides a way for platform independent naming of the logical endpoint.

By way of example only, the invention will be described in greater detail hereinafter with respect to a request to perform a print job via the Internet, which description is not intended to be limiting with respect to the particular job or the particular network communications link.

Figure 4:
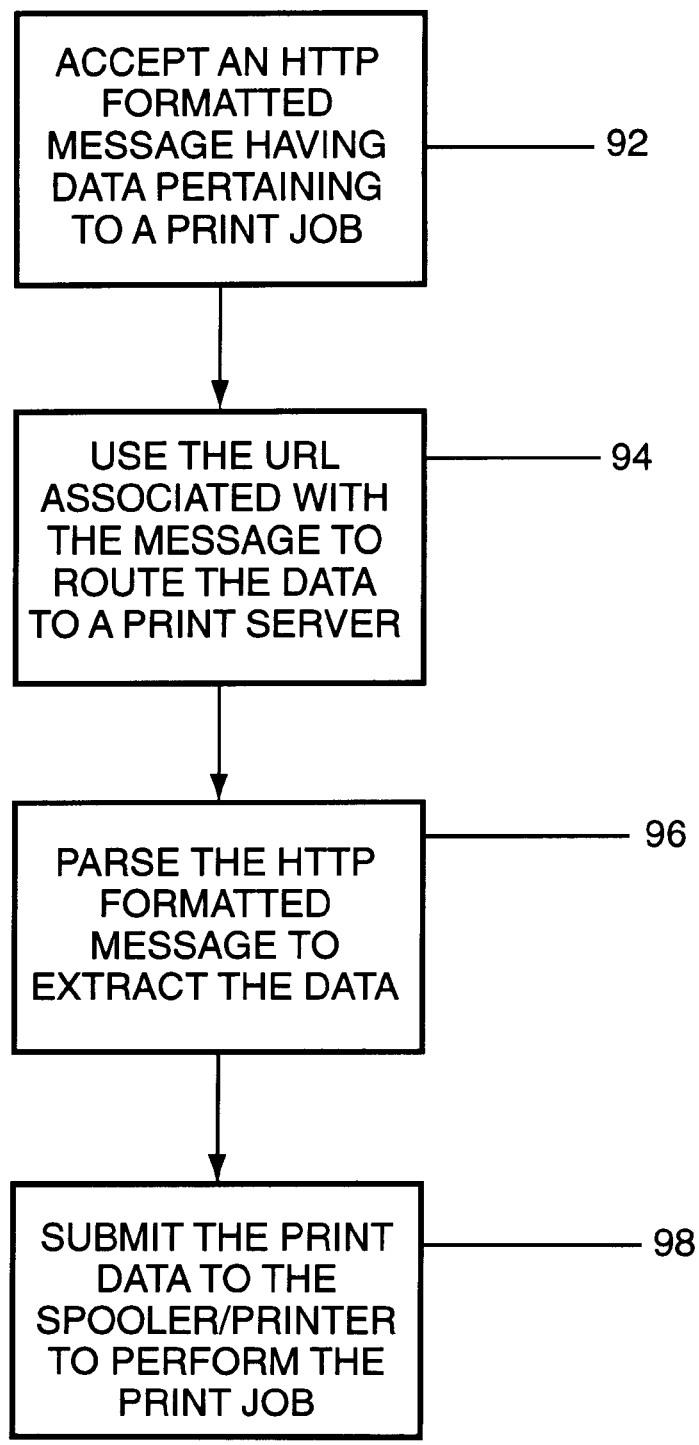
FIG. 4 illustrates a flow chart diagram of the operations of a network server which is a component of the computer network of FIG. 2.

Specifically, with reference to FIG. 4, the network client 20 and the network server 49 include the components necessary to perform the print job. Generally, the network client 20 includes an application process 60 linked to a system API 62, such as a standard text API or drawing API, which is, in turn, linked to a system spooler 64. The system spooler 64 includes a system Internet API or sockets driver 66 which provides a means for the network client 20 to communicate with the network server 49 via the Internet 68. Meanwhile, the network server 49 includes a network Internet server 70, such as a Microsoft Internet Information Server, which is used to accept transmissions from the Internet 68. The Internet server 70 is linked to a server scripter component 72, such as an Internet Server API (ISAPI) wrapper, which includes a HTTP print server component. A system spooler 74 is connected to the server scripter component 72 via an API 76 and to the printer 50 which has a URL address assigned thereto. It is to be noted that the network server 49 may be implemented as a personal computer, standalone, smart printer, or the like having all of the components discussed above.

Figure 2:
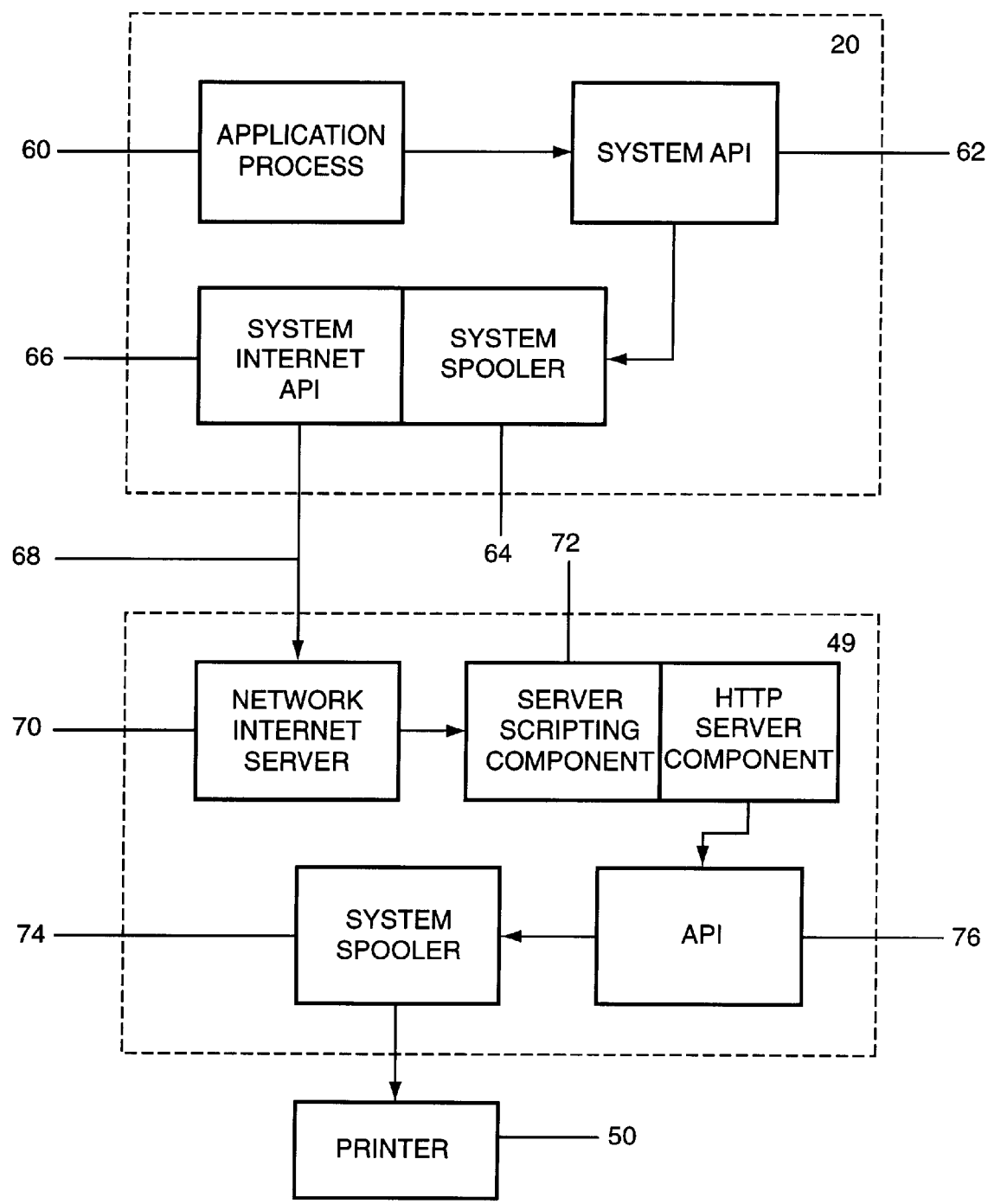
FIG. 2 illustrates a block diagram schematic view of an implementation of a computer network constructed in accordance with a first embodiment of the invention.
Figure 3:
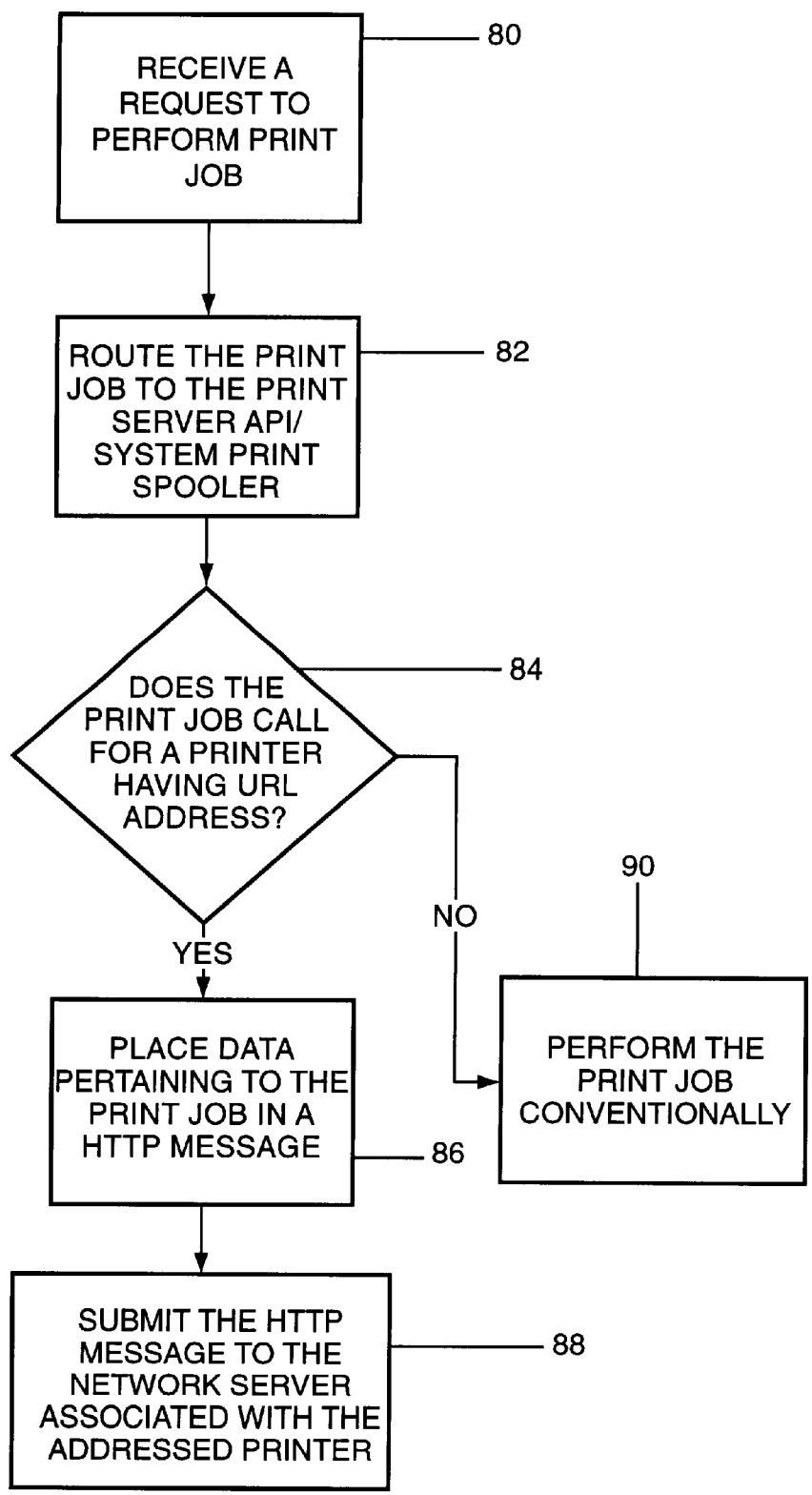
FIG. 3 illustrates a flow chart diagram of the operations of a network client which is a component of the computer network of FIG. 2.

In operation, with reference to FIGS. 2–4, the application process 60 resident on the network client 20 receives a request in step 80 to perform a print job which specifies a printer which is to perform the job. This print request is forwarded in step 82 to the network client system API 62 which, in turn, forwards the request to the system spooler 64 as is generic to all operating systems. The system spooler 64, which typically functions as an I/O manager to format print jobs for specified printers and route print jobs thereto, checks in step 84 to determine if the requested print job specifies the printer 50 by its URL address. If the URL address is detected, the system spooler 64 will call the system Internet API 66 in step 88 which is responsible for formatting the data pertaining to the single print job into a Hypertext Transfer Protocol (HTTP) POST request. In particular, HTTP is utilized as it is a protocol which is recognized as being supported by the Internet. If the system spooler 64 does not detect an URL address, the system spooler will execute the print job in step 90 according to the normal conventions supported by the operating system which the network client 20 is utilizing.

More specifically, the HTTP POST request which is generated by the system Internet API 66 may be a single HTTP POST request or multiple HTTP POST requests containing the data pertaining to the single print job. Typically, the HTTP POST request includes header and status information as well as the print job data itself. For example, the HTTP POST request may include information pertaining to the protocol version, header-length, content-type, content-length, job-name, job-originator, etc. It is also contemplated that the HTTP POST request may allow for a print by reference. In a print by reference a pointer to the file to be printed, e.g. a URL address, is supplied to the network server 49 in place of the print data itself. The network server 49 then uses the pointer to access the print data from the given location to perform the print job. For a more detailed description of the HTTP POST request and the Hypertext Transfer Protocol in general, the reader is referred to T. Berners-Lee et al., "Hypertext Transfer Protocol —HTTP/1.0", RFC 19445, MIT/LCS, May 1996, which document is incorporated herein by reference in its entirety.

Once the HTTP POST request has been submitted by the network client 20 to the Internet 68 in step 88, the network Internet server 70 resident on the network server 49 accepts the HTTP POST request in step 90 and uses the URL address of the printer 50 contained therein to route the HTTP POST request in step 94 to the server scripting component 72. The HTTP print server component of the server scripting component 72 then functions to parse the HTTP POST request in step 96 and, thereafter, utilizes the API 76 to submit the print job data to the system spooler 74 in step 100. The system spooler 74 will then submit the print job data to the printer 50 in a conventional manner for use in executing the print job which was originally requested by the network client 20.

Since standard HTTP POST messaging also provides a means for allowing status messages to be returned to the network client 20 in response to an issued HTTP POST request, the network server 49 can also be used to monitor and return the status of the print job request to the network client 20 via the Internet. For example, HTTP POST supports status messaging which may be used to report that: 1) the print request has been accepted by the network server 49 (class 200 status code which also returns an URL address which points to a resource that can be opened by a web browser which the network client 20 may use, for example, to access the job in the print queue); 2) incorrect syntax was used in the HTTP POST request (class 400 status code); 3) the network server 49 has detected a syntactically correct HTTP POST request for a resource that does not correspond to a printer (class 403 status code); 4) the HTTP POST request presents a print job which exceeds a predefined limit (class 413 status code); or 5) the header indicates that the print data is in a format not supported by the network server 49 (class 415 status code). The HTTP status messages received at the network client 20 may then be forwarded to the user in the form of a graphical user interface, textual message, or the like which those of skill in the art will understand how to formulate. Accordingly, such operations will not be discussed in greater detail herein.

Figure 5:
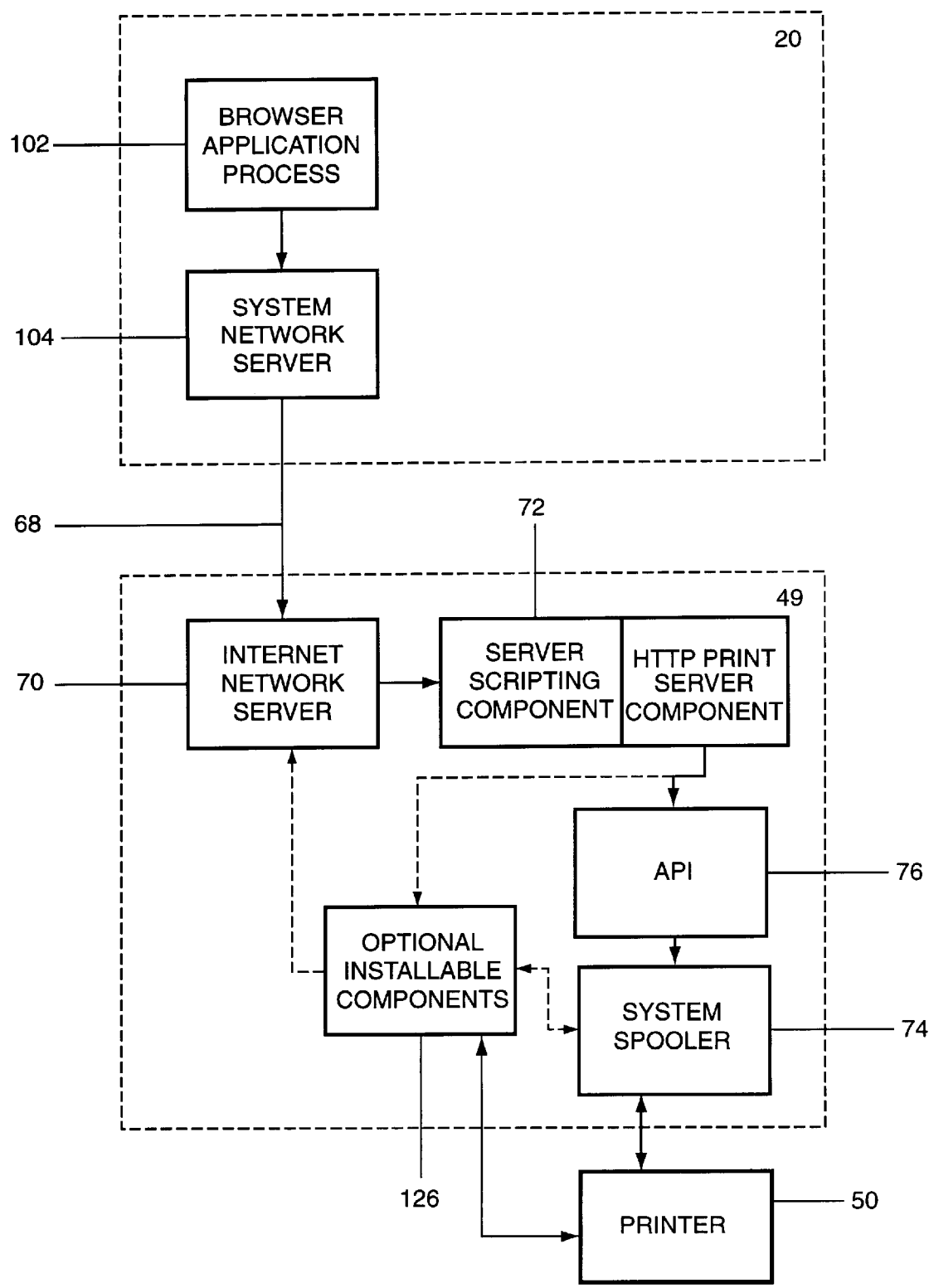
FIG. 5 illustrates a block diagram schematic view of an implementation of a computer network constructed in accordance with a second embodiment of the invention.
Figure 6:
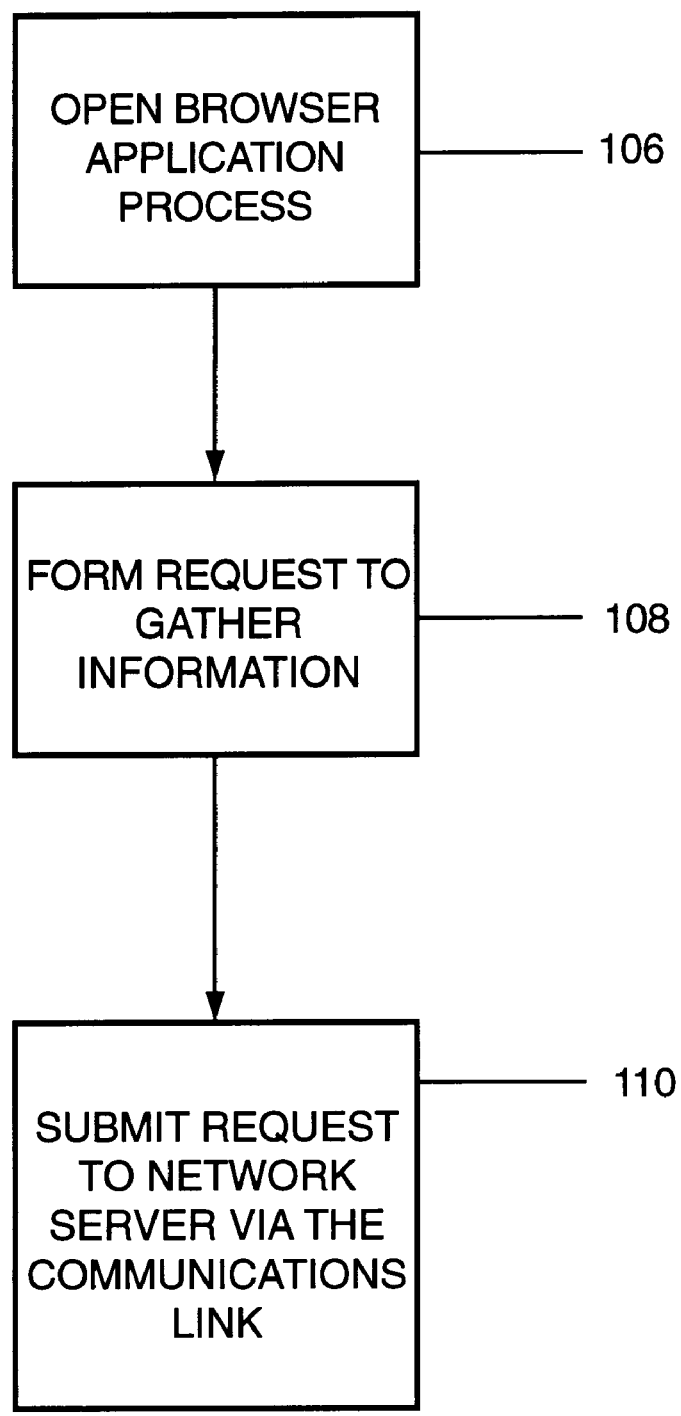
FIG. 6 illustrates a flow chart diagram of the operations of a network client which is a component of the computer network of FIG. 5.
Figure 7:
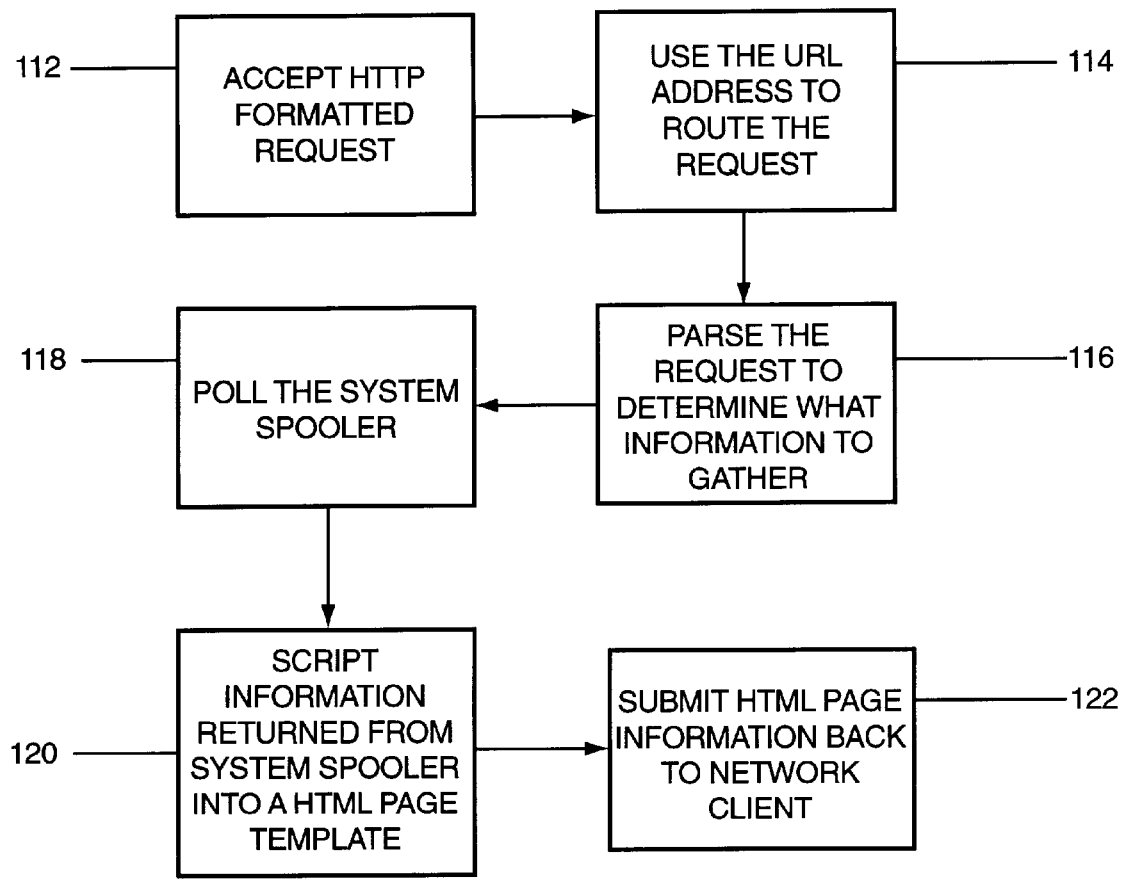
FIG. 7 illustrates a flow chart diagram of the operations of a network server which is a component of the computer network of FIG. 5.
Figure 8:
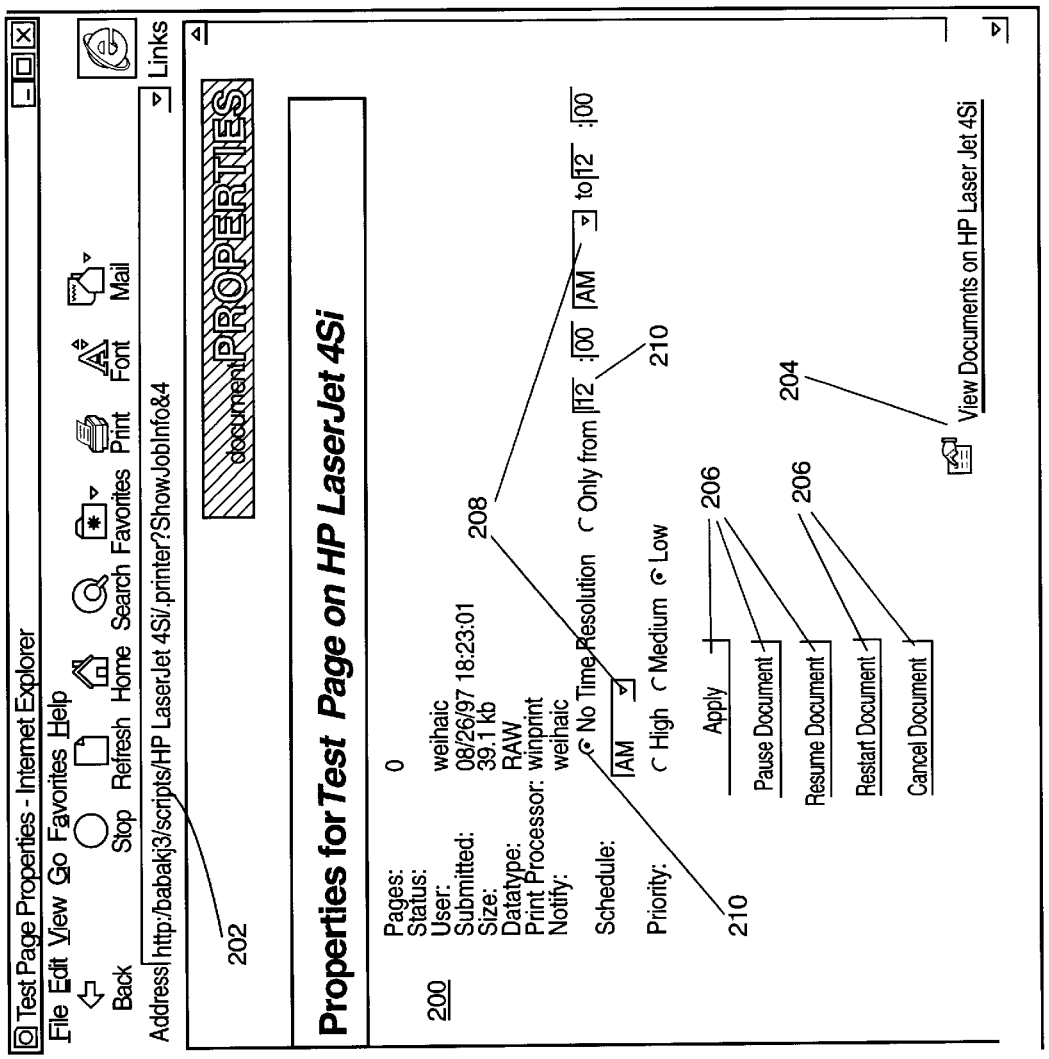
FIGS. 8–14 illustrate exemplary screen shots depicting a browser application process displaying informational and administrative HTML pages in accordance with the invention illustrated in FIGS. 5–7.
Figure 9:
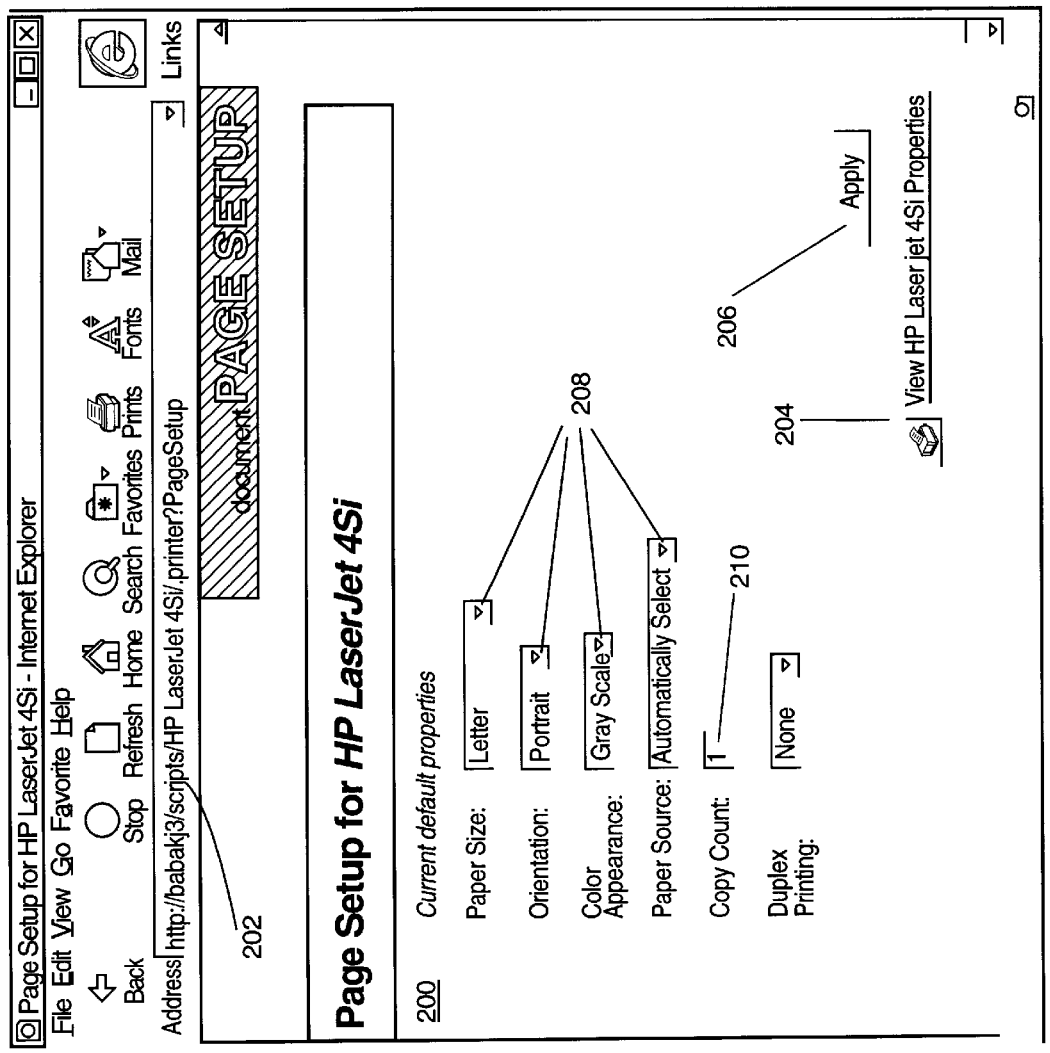
Figure 10:
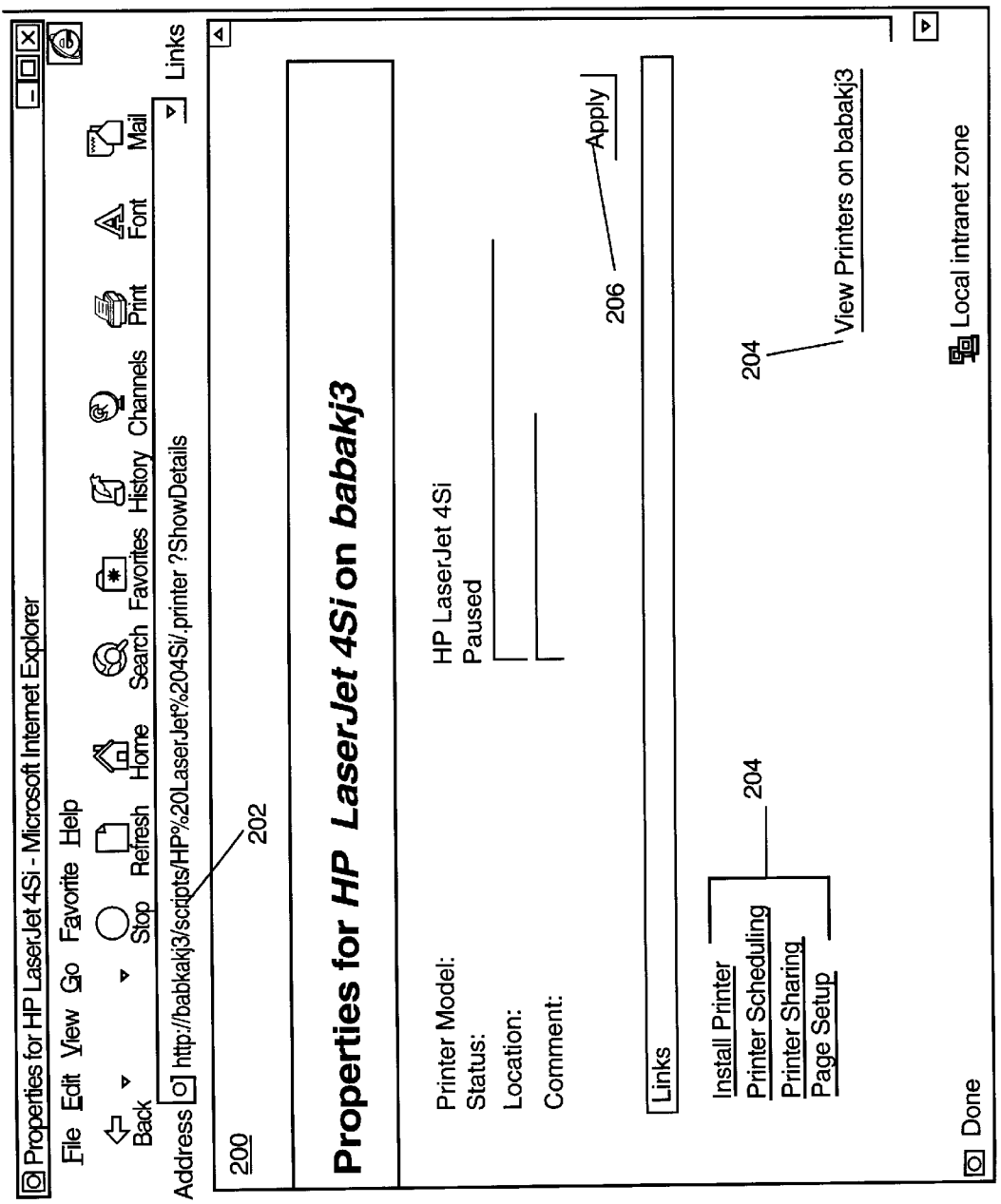
Figure 11:
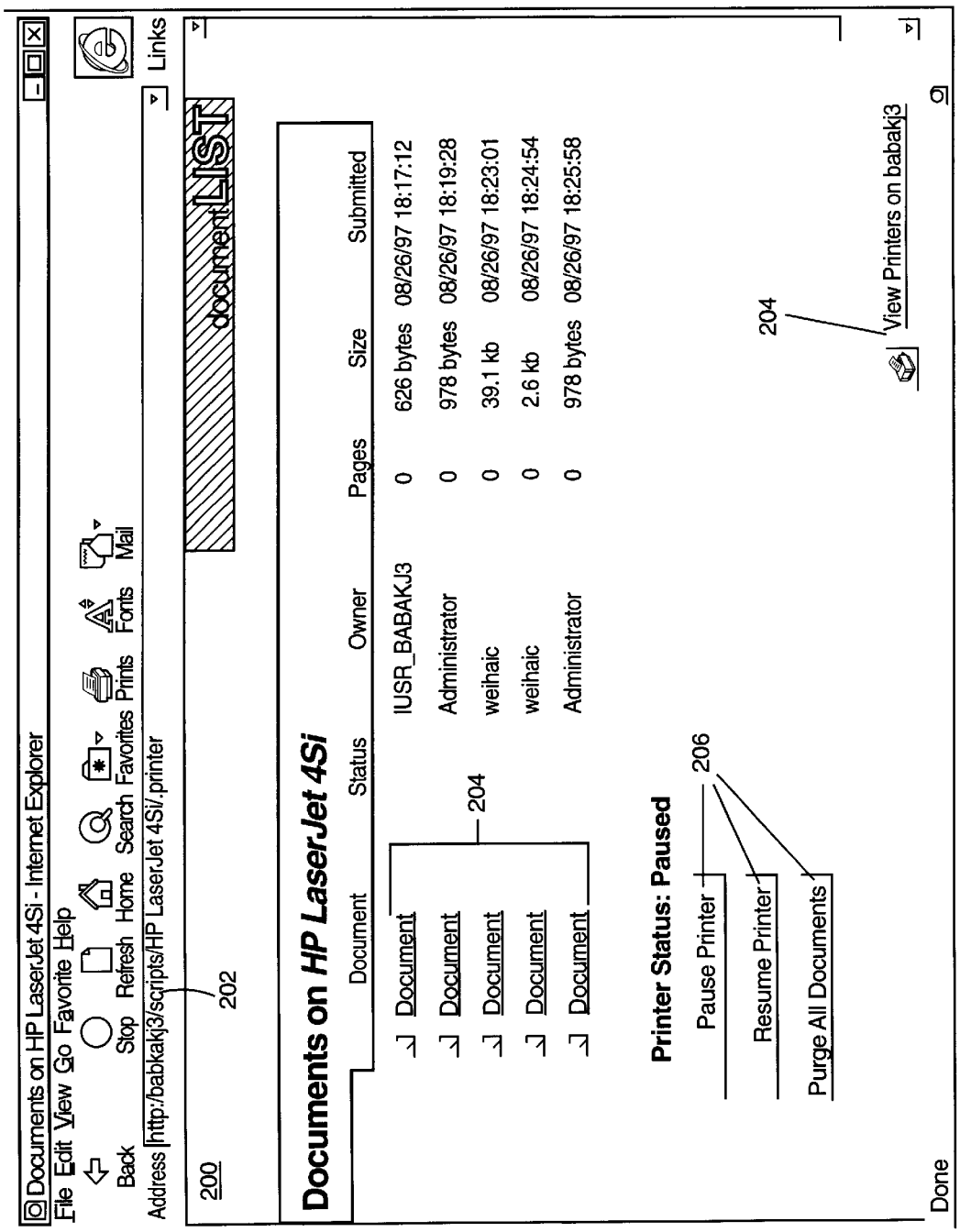
Figure 12:
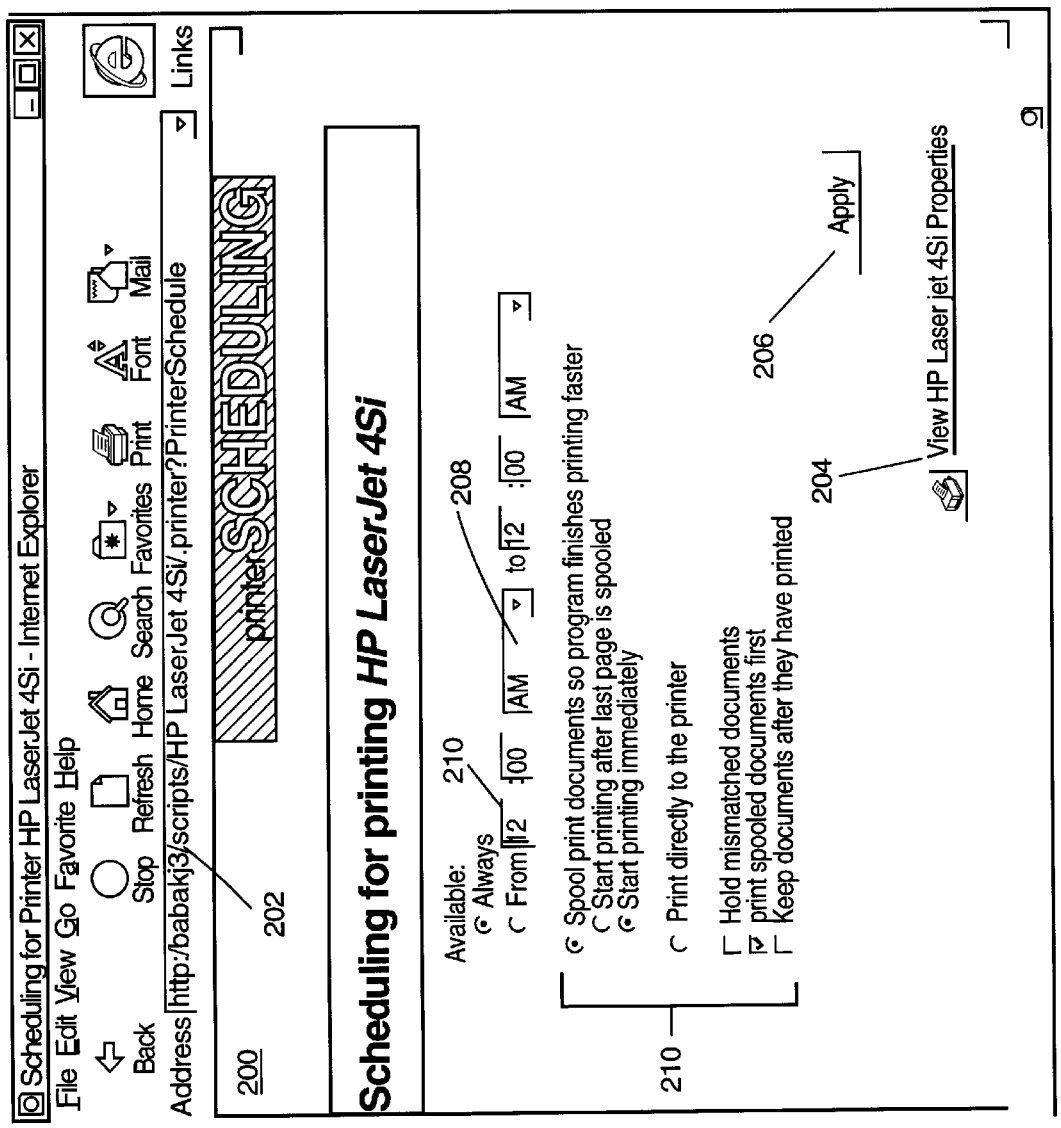
Figure 13:
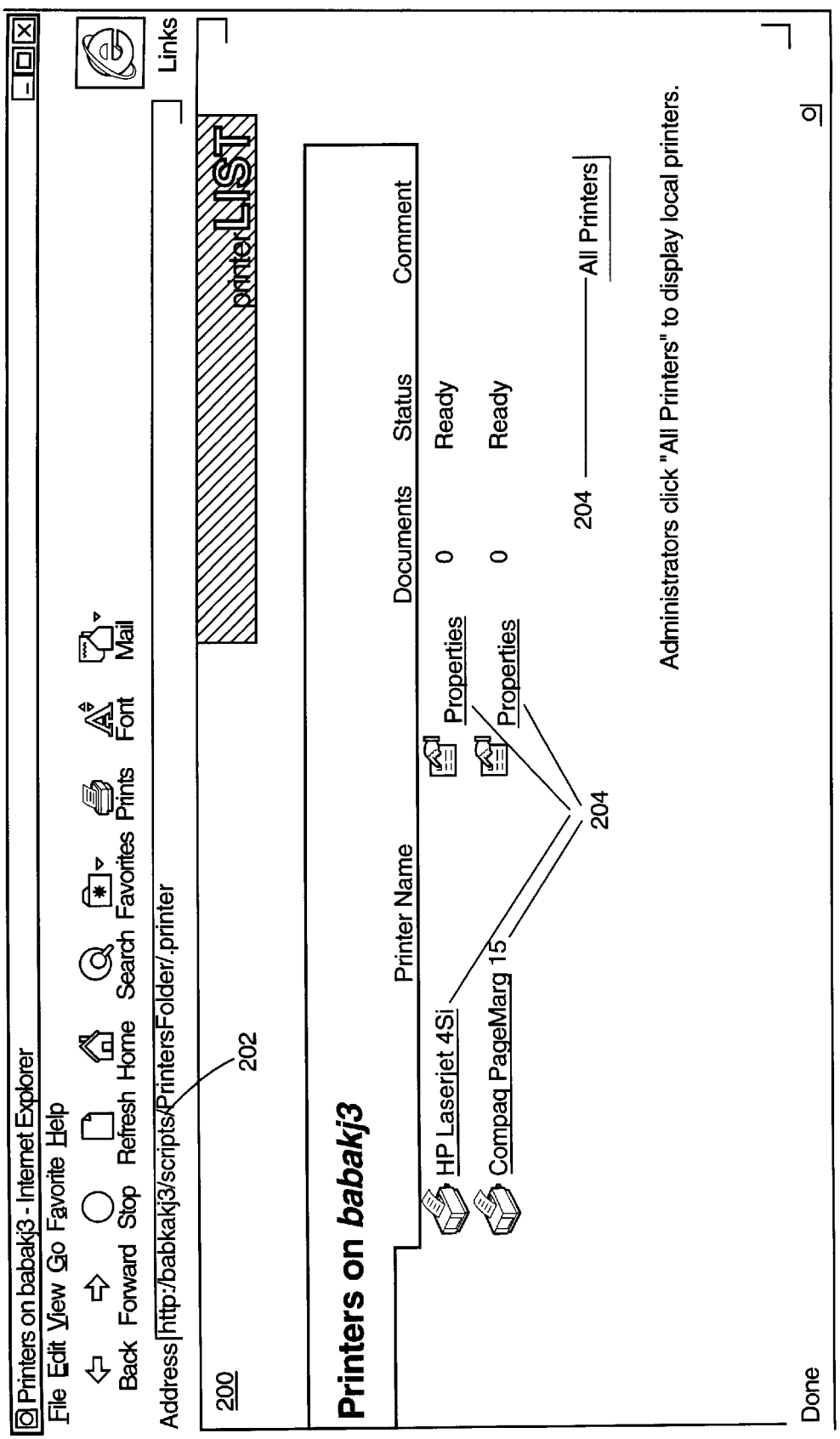
Figure 14:
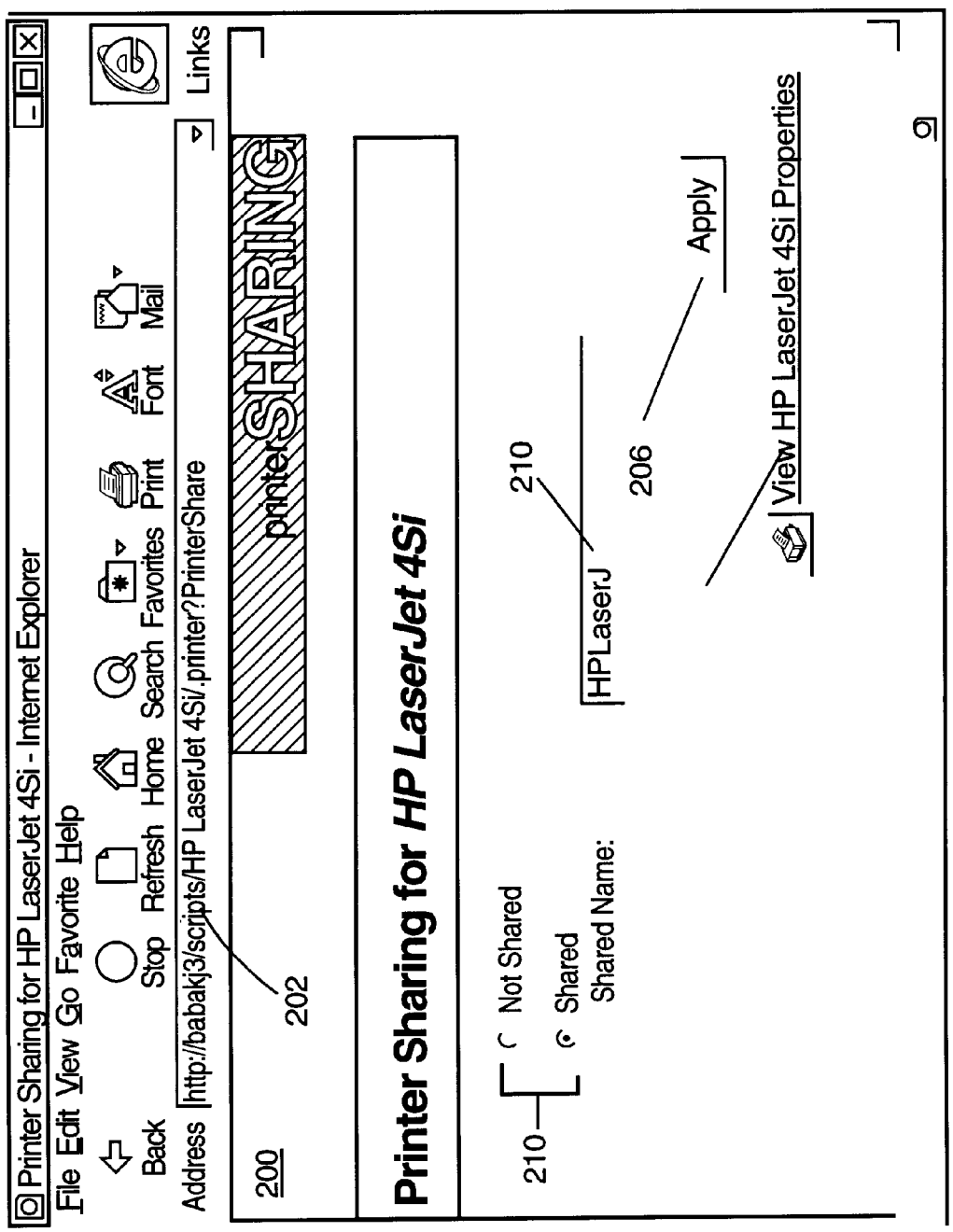

In yet a further embodiment of the invention, illustrated in FIGS. 5–7, the invention generally provides a means for providing a graphical user interface which allows the user of the network client 20 to monitor the status of the network server 49. This embodiment of the invention also provides a means for providing a graphical user interface which allows the user of the network client 20 to perform various administrative tasks on the network server 49, for example, pausing, resuming and/or canceling a print job queued on the system spooler 74. Specifically, in the subject embodiment, illustrated in FIG. 5, the network server 49 continues to include the components previously discussed while the network client 20 further includes a standard Internet browser application process 102, such as Microsoft Internet Explorer, Netscape, or the like, and an associated Internet network server 104. The Internet network server 104 resident on the network client 20 and the Internet network server 70 resident on the network server 49 are linked via the Internet and allow the network client 20 and the network server 49 to bi-directionally communicate with one another utilizing conventional Internet protocol. As before, the operation of this embodiment of the invention will be described hereinafter with respect to monitoring and/or administering printing apparatuses and operations over the Internet which particular application and network are not intended to be limiting.

During the operation of this embodiment of the invention, the user of the network client 20 opens in step 106 the browser application process 102 at which time the user can enter in step 108 a HTTP formatted request containing a URL address to obtain system administration information from the server computer 49 relating to, for example, the status of a print job, job queues, printer support, printer properties, etc. As will be appreciated, the URL address may be supplied to the user by any conventional method, for example, as hot links on a Hypertext Markup Language (HTML) page of a print service provider or, as discussed previously, in a class 200 status reply message to a previously requested print job. The HTTP formatted request is then submitted in step 110 by the browser application process 102 operating in connection with the network Internet server 104 to the network server 49 via the Internet.

After the HTTP formatted request is accepted in step 112 by the network Internet server 70 resident on the network server 49, the accepted request is routed in step 114 to the server scripting component 72 utilizing the URL address contained therein. The server scripting component 72 then parses the request in step 116 and polls the system spooler 74 via the API 76 in step 118 to gather the requested information therefrom. The spooler 74 may, in turn, poll the printer 50 to gather some of the requested information, such as real time printer status or error information, when the printer 50 supports bi-directional communication. In particular, the information to be gathered is determined as a function of the URL address specified in the request. Once the server scripting component 72 receives the requested information from the system spooler 74 in step 120, the server scripting component 72 generates an HTML page in step 120 containing the gathered information. Specifically, the server scripting component 72 includes various HTML page templates corresponding to the various requests which it supports into which the gathered information is scripted. The HTML page information is then submitted back to the browser application process 100 in step 122 via the network Internet servers 70,104, again utilizing conventional Internet protocol procedures, for viewing by the user.

In further embodiments of the invention, the HTML page returned to the network client 20 may also contain hot links to other informational HTML pages which the network server 49 has available for viewing. Additionally, the HTML pages may contain activatable icons, menu fields and/or writable fields for allowing the user to issue system administration commands back to the network server 49 for use in controlling the operation of the system spooler 74/printer 50, for example, to control page setup, printer scheduling, pausing, restarting, or canceling a print job, etc. By way of example, FIGS. 8–14 illustrate screen shots of various HTML pages 200 displayed on the Microsoft Internet Explorer browser which were generated according to the invention in response to user entered, HTTP formatted messages 202. As discussed previously, the HTML page information returned to the browser is a function of the URL address specified in the HTTP formatted request message issued by the network client 49. Further illustrated in the figures are examples of hot links 204 to other HTML pages which are supported by the server computer 49 and icons 206, menu fields 208, and writable fields 210 which may be employed by the user to cause commands to be issued to the system spooler 74/printer 50. Those of skill in the computer art will appreciate that these commands are forwarded to the network server 49 by the browser application in a conventional manner.

As further illustrated in FIG. 5, this embodiment of the invention also provides for the use of optional installable components 126. The installable components 126 may be utilized by print vendors, for example, to present customized HTML pages to the network client 20 in lieu of the standard HTML pages supported by the server scripting component 72 or to respond to specialized informational requests generated by the network client 20. More specifically, the installable components 126 are used to supplement the server scripting component 72 and similarly function to poll the system spooler 74 and/or the printer 50 in response to requests issued by the network client 20 as a function of the specified URL address. Again, the information returned by the system spooler 74/printer 50 as a result of the polling operation is scripted into a customized HTML page template. The optional components 126 may then submit the customized HTML page information directly back to the network client 20 via the network Internet server 70.

The use of the installable components 126 also provides the ability for vendors to include in the HTML pages hot links to other Internet web sites. By way of example, a customized HTML page can be created that returns a hot link to a vendor Internet site that answers frequently asked questions about printer errors when an HTML page reporting that a print operation has failed is being returned to the browser. Additionally, the installable components 126 installed by the vendors may include code for implementing a Dynamic-Link Library (DLL) which is provided as a means for allowing communication with a printer which has a proprietary communications protocol. In this manner, not only will the installable component 126 provide a means for the server scripting component 72 to communicate with the system spooler 74/printer 50 but also will allow the printer 50 to return specialized information to the installable components 126 which is supported by the protocol, such as low toner, paper tray A empty, etc. This rich set of specialized information may also be included in the customized HTML pages and returned to the user for viewing.

From the foregoing descriptions, it will be appreciated that the invention minimizes the problems discussed previously with respect to distributed computer networks. Specifically, these problems are addressed by utilizing a URL addressing and HTTP messaging scheme which is operating system and platform independent, so long as the server machine incorporates an Internet server. Additionally, it will be appreciated that the invention also overcomes the problems associated with system administration by utilizing the above noted addressing and messaging schemes in connection with standardized network browsers to remove the need for specialized server side administration tools.

In view of the many possible embodiments to which the principles of this invention may be applied, it should be recognized that the embodiments described herein with respect to the drawing figures is meant to be illustrative only and should not be taken as limiting the scope of invention. For example, those of skill in the art will recognize that the elements of the illustrated embodiments shown in software may be implemented in hardware and vice versa or that the illustrated embodiments can be modified in arrangement and detail without departing from the spirit of the invention. Therefore, the invention as described herein contemplates all such embodiments as may come within the scope of the following claims and equivalents thereof.

We claim:

1. In a network server including a system print spooler in communication with a plurality of printers each having a Uniform Resource Locator (URL) address, a method for returning printer administration information to a network client, the method comprising:
receiving from the network client a Hypertext Transfer Protocol (HTTP) formatted request message including a URL address specifying one of the plurality of printers; polling the system print spooler as a function of the URL address to gather the printer administration information of the specified one of the plurality of printers; scripting the printer administration information into a Hypertext Markup Language (HTML) template; and submitting the HTML page template back to the network client whereby the network client may use a conventional web browser to view the printer administration information without the need for any specialized printer communication software.

2. The method as recited in claim 1, further comprising the step of polling the printer specified by the URL address in the HTTP formatted request message to gather some of the printer administration information.

3. The method as recited in claim 1, wherein the HTML page template comprises a hot link to another HTML page template resident on the network server.

4. The method as recited in claim 1, wherein the HTML page template comprises a hot link to another network server.

5. The method as recited in claim 1, wherein the HTML page template comprises activatable icons which may be used to submit printer command messages back to the network server.

6. The method as recited in claim 1, wherein the HTML page template comprises activatable menus which may be used to submit printer command messages back to the network server.

7. The method as recited in claim 1, wherein the HTML page template comprises writable fields which may be used to submit printer command messages back to the network server.

8. The method as recited in claim 1, further comprising the step of using a Dynamic-Link Library (DLL) to format the polling request.

9. A computer-readable medium having instructions for returning printer administration information to a network client from a network server including a system print spooler in communication with a plurality of printers each having a Uniform Resource Locator (URL) address, the instructions performing the steps of: receiving from the network client a Hypertext Transfer Protocol (HTTP) formatted request message including a URL address specifying one of the plurality of printers; polling the system print spooler as a function of the URL address to gather the printer administration information of the specified one of the plurality of printers; scripting the printer administration information into a Hypertext Markup Language (HTML) template; and submitting the HTML page template back to the network client whereby the network client may use a conventional web browser to view the printer administration information without the need for any specialized printer communication software.

10. The computer-readable medium as recited in claim 9, which performs in the network server the further step of using a Dynamic-Link Library (DLL) to format the polling request.

11. In a computer network comprising a network client in communication with a network server having a system print spooler in communication with a plurality of printers each having a Uniform Resource Locator (URL) address, a method for performing system printer administration comprising: using a standard Internet browser in the network client to forward to the network server a Hypertext Transfer Protocol (HTTP) formatted request message having a URL address specifying one of the plurality of printers; receiving at the network server the Hypertext Transfer Protocol (HTTP) formatted message; polling the system print spooler as a function of the URL address in the HTTP formatted request message to gather the printer administration information of the specified printer; scripting the printer administration information into a Hypertext Markup Language (HTML) page template; submitting the HTML page information back to the network client; causing the Internet browser to display the HTML page whereby the printer administration information is displayed without the need for any specialized printer communication software.

12. The method as recited in claim 11, wherein the HTML page template comprises a hot link which the network client may use to perform the further step of supplying a new HTTP formatted request message to the network server to retrieve different printer administration information.

13. The method as recited in claim 11, wherein the HTML page template comprises a hot link which the network client may use to perform the further step of linking to another network server.

14. The method as recited in claim 11, wherein the HTML page template comprises activatable icons for use in submitting printer command messages back to the network server to control the system spooler.

15. The method as recited in claim 11, wherein the HTML page template comprises activatable menus for use in submitting printer command messages back to the network server to control the system spooler.

16. The method as recited in claim 11, wherein the HTML page template comprises writable fields for use in submitting printer command messages back to the network server to control the system spooler.

* * * * *

UNITED STATES PATENT AND TRADEMARK OFFICE
CERTIFICATE OF CORRECTION

PATENT NO.    : 6,240,456 B1
DATED         : May 29, 2001
INVENTOR(S)   : Teng et al.

It is certified that error appears in the above-identified patent and that said Letters Patent is hereby corrected as shown below:

<u>Title page,</u>
Item [56], References Cited, the following citations are added:
U.S. PATENT DOCUMENTS:
-- 5,946,458      08/31/1999      Austin et al.
  "5,740,263" should read -- 5,740,231 --.
"Pipeline's Internet Printing System Lets the Printer Surf the Web," The Observer, March 1997, pp. 45-46.

"Disk Drive with Embedded Hyper-Text Markup Language Server," IBM Technical Disclosure Bulletin, Vol. 38, No. 12, December 1995. --

Signed and Sealed this

Third Day of September, 2002

*Attest:*

*Attesting Officer*

JAMES E. ROGAN
*Director of the United States Patent and Trademark Office*